United States Patent [19]

Rasberry et al.

[11] Patent Number: 4,803,654
[45] Date of Patent: Feb. 7, 1989

[54] CIRCULAR FIRST-IN, FIRST OUT BUFFER SYSTEM FOR GENERATING INPUT AND OUTPUT ADDRESSES FOR READ/WRITE MEMORY INDEPENDENTLY

[75] Inventors: Joseph D. Rasberry, Bethel; Karl D. Nitschke, Brookfield, both of Conn.

[73] Assignee: General Datacomm Industries, Inc., Middlebury, Conn.

[21] Appl. No.: 747,095

[22] Filed: Jun. 20, 1985

[51] Int. Cl.$^4$ ............................................. G06F 12/02
[52] U.S. Cl. ................................................... 364/900
[58] Field of Search ... 364/200 MS File, 900 MS File, 364/134; 365/221, 78, 189

[56] References Cited

U.S. PATENT DOCUMENTS

| 4,258,418 | 3/1981 | Heath | 364/200 |
|---|---|---|---|
| 4,423,482 | 12/1983 | Hargrove et al. | 364/200 |
| 4,459,681 | 7/1984 | Ohtsuka | 365/221 |
| 4,486,854 | 12/1984 | Yuni | 364/900 |
| 4,507,760 | 3/1985 | Fraser | 364/134 |
| 4,616,338 | 10/1986 | Helen et al. | 365/189 |

Primary Examiner—Raulfe B. Zache
Assistant Examiner—Emily Y. Chan
Attorney, Agent, or Firm—Pennie & Edmonds

[57] ABSTRACT

A circulating FIFO buffer eliminates the need to move the data through the register and relies instead on input and output counters to load data into the register and read data therefrom. Apparatus comprises an addressable read/write memory, an input counter and an output counter, both of which address the memory, means for resetting the counters, means for enabling the input counter to increment and to load data into the buffer, means for enabling the output counter after a predetermined amount of data has been loaded into the buffer, means for disabling the input counter when the buffer register has been loaded and means for detecting when the outputs of the output and input counters are equal and for activating the resetting means upon detecting such equality.

12 Claims, 3 Drawing Sheets

CIRCULAR FIRST-IN, FIRST OUT BUFFER SYSTEM FOR GENERATING INPUT AND OUTPUT ADDRESSES FOR READ/WRITE MEMORY INDEPENDENTLY

BACKGROUND OF THE INVENTION

This relates to a circular first in, first out (FIFO) buffer and in particular to one useful in data communication applications to accommodate different clocking rates.

A FIFO buffer of the prior art consists essentially of a serial input, serial output shift register. Input data is supplied to an input of the shift register, data is shifted through the register by a clock signal, and output data is derived from an output of the register. Such a system however is relatively slow and/or power intensive because data must be physically moved through a series of flip flops in the register. Moreover, to produce an output signal, it is necessary to move the data through every cell of the shift register.

SUMMARY OF THE INVENTION

We have invented a circulating FIFO buffer which eliminates the need to move the data through the register and relies instead on input and output counters to load data into the register and read data therefrom. Apparatus in accordance with the invention comprises an addressable read/write memory, an input counter and an output counter, both of which address the memory, means for resetting the counters, means for enabling the input counter to increment and to load data into the buffer, means for enabling the output counter after a predetermined amount of data has been loaded into the buffer, means for disabling the input counter when the buffer register has been loaded and means for detecting when the outputs of the output and input counters are equal and for activating the resetting means upon detecting such equality.

BRIEF DESCRIPTION OF THE DRAWINGS

These and other objects, features and advantages of the invention will be more readily apparent from the following description of the preferred embodiment of the invention in which.

DESCRIPTION OF THE PREFERRED EMBODIMENT

Figure 1:
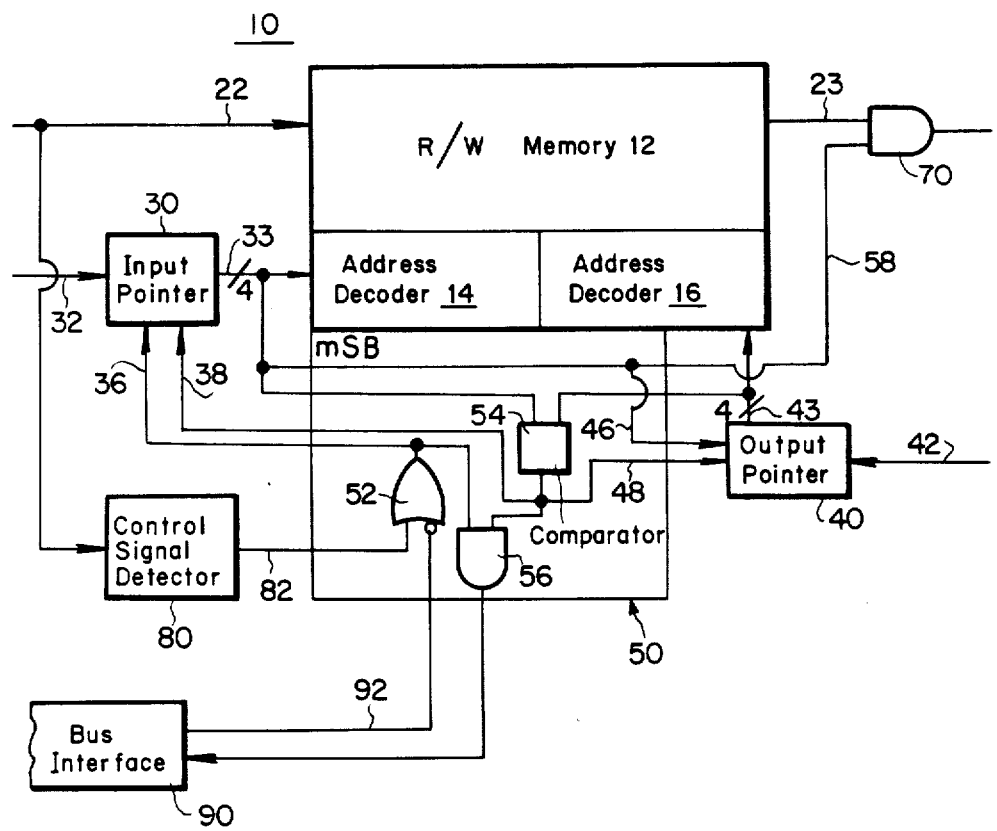
FIG. 1 is a block diagram illustrating a preferred embodiment of the invention.

As shown in FIG. 1, apparatus used in the practice of the invention comprises a buffer 10, an input pointer 30, an output pointer 40, control logic 50, AND gate 70, a control signal detector 80 and a bus interface 90. Buffer 10 is an addressable read/write semiconductor memory 12 which preferably includes two address decoders 14, 16 to a data input 22, and a data output 23. Buffer 10 stores input data in read/write memory 12 at the memory address or cell identified by the address decoded by address decoder 14 and provides to output line 23 data stored in the cell of memory 12 at the address decoded by address decoder 16.

Figure 4:
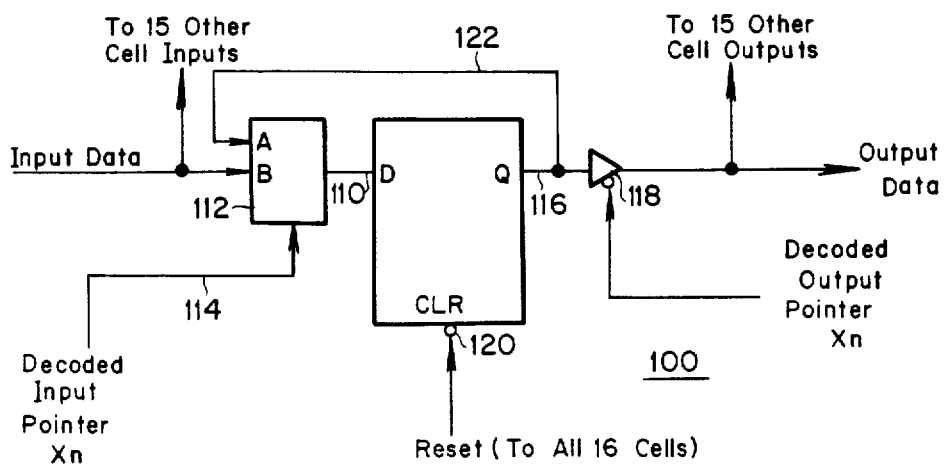
FIG. 4 is a block diagram illustrating one cell used in the practice of the invention.

An illustrative cell 100 of such a buffer is shown in FIG. 4. The cell comprises a data input 110, a 2:1 multiplexer 112, a cell input selector 114, a data output 116, a cell output selector 118, and a reset input 120. When input B of the multiplexer is selected by the decoded input pointer, new data is stored in the cell. Otherwise, the data already stored in the cell is recirculated through path 122 and input A to the cell. Signals to the cell input and output selectors 114, 116 are derived from address decoders 14, 16 respectively which decode the signals from pointers 30, 40 to select a specific cell for input or output.

The buffer of FIG. 4 has 16 addresses at each of which one bit of information may be stored. Obviously, buffers of different sizes can be used to suit the needs of the application. For example, the buffer may have a different number of storage addresses and/or it may store more than one bit at each address.

Input/output pointers 30, 40 are counters which produce a coded output on lines 33, 43, respectively. The counters are enabled by a signals on lines 36, 46, respectively, are incremented by signals on input lines 32, 42, respectively, and are reset by signals on lines 38, 48, respectively.

Control logic 50 comprises an OR gate 52, a comparator 54 and an AND gate 56. The output of OR gate 52 is applied via line 36 to enable input pointer 30. Comparator 54 compares the coded address signals on the output lines 33, 43 from input pointer 30 and output pointer 40 and produces a reset signal on line 38 and 48 to these pointers when the address signals are identical. The reset signal is also provided to AND gate 56 and to other circuitry to control data flow to the buffer. Control logic 50 also includes a data clamp line 58 to AND gate 70 and an enable line 46 to output pointer 40. The signal on these lines illustratively is supplied by the signal that is the most significant bit of the coded signal on the output line from input pointer 33. AND gate 70 clamps the output on output line 23 from buffer 10 in response to the signal received on line 58.

Control signal detector 80 detects a control signal such as request to send which illustratively is provided at the beginning of any data signal supplied on line 22 to buffer 10. Upon detecting the control signal, detector 80 produces a high signal on line 82 to OR gate 52. Bus interface 90 provides a signal on line 92 that is high during data transmission on line 22. This signal is applied to another input to OR gate 52. As a result of this logic arrangement, OR gate 52 will produce a high signal to enable input pointer 30 whenever the control signal is detected by detector 80 or the data transmission signal is provided on line 92 and the output of OR gate 52 will be low when there is no data transmission.

Figure 2:
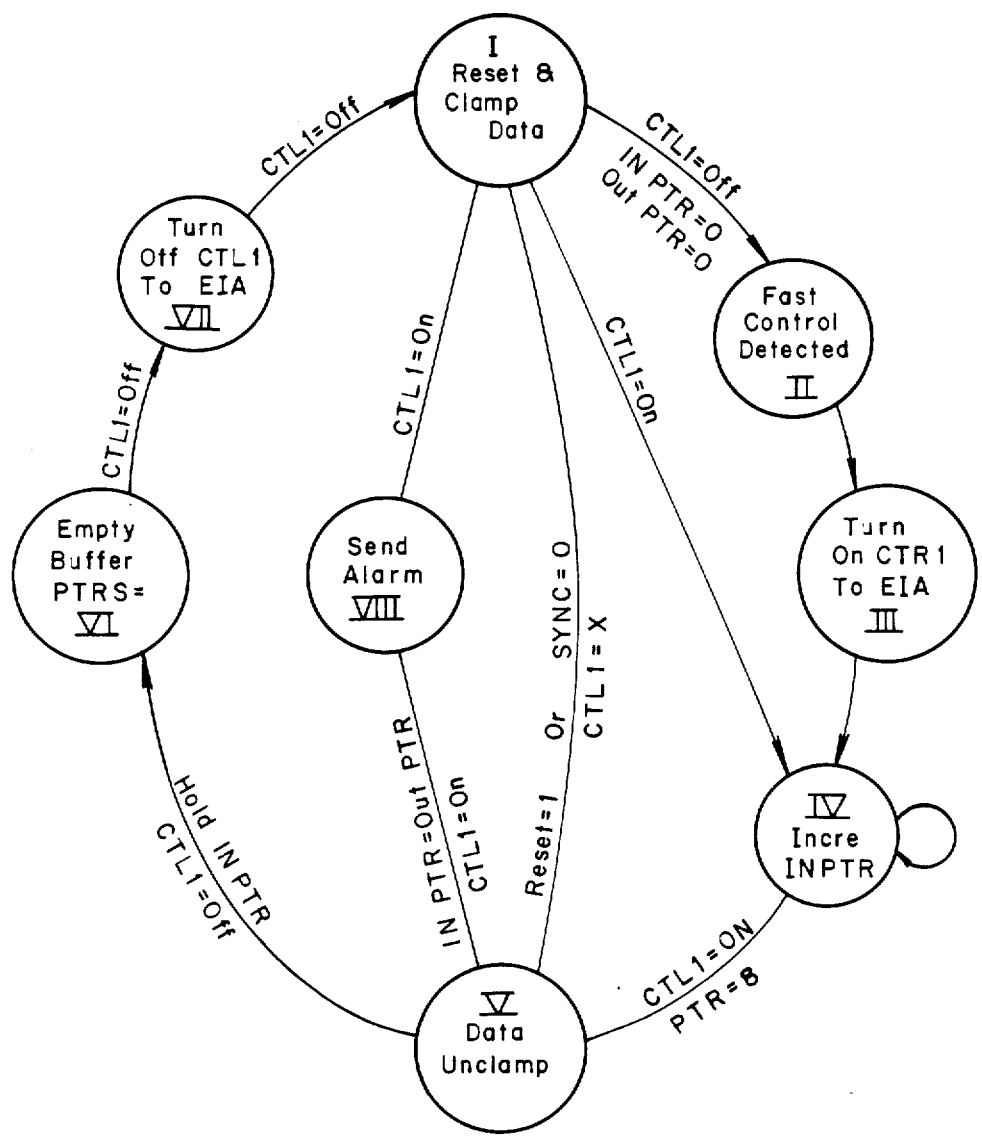
FIG. 2 is a state diagram illustrating the operation of the invention.
Figure 3:
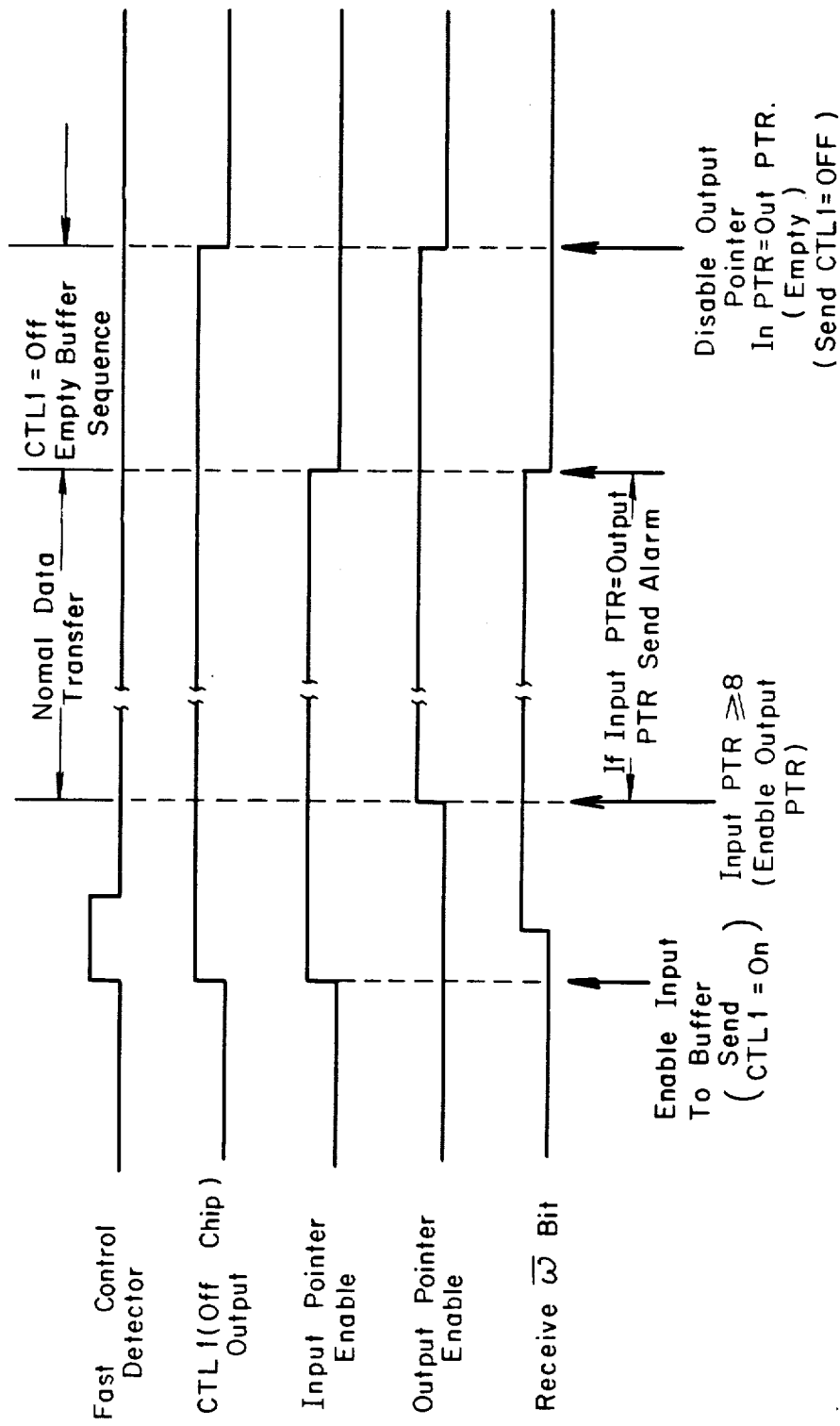
FIG. 3 is a timing diagram depicting illustrative signals used in the practice of the invention.

The operation of the apparatus of FIG. 1 is described in the flow chart of FIG. 2 and timing diagrams of FIG. 3. As shown therein, in an initial State I, both the input pointer and the output pointer are in a reset condition where they are held to a count of zero. In this state, the most significant bit of the output from the input counter 30 is zero with the result that AND gate 70 is disabled and the data buffer output is clamped to prevent spurious data from being presented on the data output line. During this state, control signal detector 80 monitors input data line 22 for the control signal indicating the beginning of data. When this signal is detected (State II) detector 80 produces a high signal on output line 82 to OR gate 52 (State III). As a result, the output of OR gate 52 goes high thereby enabling input counter 30 (State IV). Since the counter is enabled, it will clock data on input line 22 into read/write memory 12 at a rate determined by a clock signal applied on line 32. In a typical application, the circuitry of FIG. 1 is used in a data receiver and the clock signal is the receive data select signal. As a result, data is stored in each cell of memory 12.

When the input pointer reaches a count of eight, the most significant bit of the coded signal on output lines 33 becomes a one (State V). As a result, output pointer 40 and AND gate 70 are enabled. Normal data transfer into memory 12 in response to one clock signal applied to pointer 30 and out of memory 12 in response to a second clock signal applied to pointer 40 then proceeds. Illustratively, in a data receiver, the output clock signal is the receiver clock.

If at any time, comparator 54 detects that the input pointer equals the output pointer, an alarm signal is generated on line 55 (State VIII) and the input pointer and output pointer are reset and a signal is applied to AND gate 56. If the signal on either line 82 or line 92 is still high, the output of OR gate 52 is high and AND gate 56 is enabled. As a result an alarm signal is provided on line 57 to other apparatus in the data system (e.g. a warning light or the like). Upon resetting the input pointer, the most significant bit of the output signal from pointer 30 becomes zero and the data output is again clamped (State I). However, if the signal on either lines 82 or 92 is still high, input pointer 30 remains enabled (State IV) and can increment to a count of eight. Upon reaching a count of eight, the normal data mode (State V) resumes with output pointer 40 and AND gate 70 enabled.

At some point, the signal on line 92 will go low signifying the end of data transmission. When this happens the input pointer is held at its count (State VI) until the count of the output pointer equals the count of the input pointer. When this condition is reached, buffer 10 is empty, the counter is reset by comparator 54 and a signal is provided to the data source.

What is claimed is:

1. A first in, first our buffer system comprising:
   an addressable read/write memory means comprising a data input and a data output, means for storing data applied to said data input at a first address specified by a first address input and means for providing to said data output data stored at a second address specified by a second address input,
   an input address decoder for selecting a specific address in said read/write memory means at which data is to be stored in response to the first address input,
   an output address decoder for selecting a specific address in said read/write memory means from which stored data is to be provided to said data output in response to the second address input,
   an input counter for generating said first address which is applied to said input address decoder,
   an output counter for generating said second address which is applied to said output address decoder,
   means for resetting said input and output counters,
   means for enabling the input counter so that it can be incremented in response to a signal applied to an input of said counter,
   means for enabling the output counter so that it can be incremented in response to a signal applied to an input of said counter, and
   means for comparing the output of said input counter and the output of said output counter and for activating said resetting means when the outputs of said counters are the same.

2. The apparatus of claim 1 wherein the means for enabling the output counter delays the start of the output counter with respect to the start of the input counter.

3. The apparatus of claim 1 wherein the means for enabling the output counter is a signal applied to the output counter from the input counter when the input counter reaches a predetermined count greater than zero.

4. The apparatus of claim 1 wherein the input counter is incremented in response to a clock signal applied to an input of said count.

5. The apparatus of claim 1 wherein the buffer system is used in a data receiver and the input counter is incremented in response to a receive data select signal applied to an input of said counter.

6. The apparatus of claim 5 wherein the output counter is incremented in response to a receiver clock signal applied to an input of said counter.

7. The apparatus of claim 1 wherein the output counter is incremented in response to a clock signal applied to an input of said counter.

8. The apparatus of claim 1 wherein the buffer system is used in a data receiver and the output counter is incremented in response to a receiver clock signal applied to an input of said counter.

9. The apparatus of claim 1 wherein the resetting means resets the input and output counters simultaneously.

10. A first in, first out buffer system comprising:
    an addressable read/write memory means comprising a data input and a data output, means for storing data applied to said data input at a first address specified by a first address input and means for providing to said data output data stored at a second address specified by a second address input,
    an input address decoder for selecting a specific address in said read/write memory means at which data is to be stored in response to the first address input,
    an output address decoder for selecting a specific address in said read/write memory means from which stored data is to be provided to said data output in response to the second address input,
    an input counter for generating said first address which is applied to said input address decoder,
    an output counter for generating said second address which is applied to said output address decoder,
    means for resetting said input and output counters,
    means for enabling the input counter so that it can be incremented in response to a signal applied to an input of said counter,
    means for enabling the output counter so that it can be incremented in response to a signal applied to an input of said counter, and
    means for comparing the output of said input counter and the output of said output counter and for activating said resetting means when the outputs of said counters are the same,
    said addressable read/write memory means further comprising:

a plurality of read/write data storage cells, each having a data input and a data output, a data input selector, connected to the data input of each cell, to which is applied a selection signal from said input address decoder, and a data output selector, connected to the data output of each cell, to which is applied a selector signal from said output address decoder.

11. The apparatus of claim 10 wherein each said data input selector comprises a multiplexer for selectively recirculating data previously stored in said cell or accepting new data for storage in said cell in response to a selection signal from said input address decoder.

12. A first in, first out buffer system comprising:

an addressable read/write memory means comprising a data input and a data output, means for storing data applied to said data input at a first address specified by a first address input and means for providing to said data output data stored at a second address specified by a second address input, an input address decoder for selecting a specific address in said read/write memory means at which data is to be stored in response to a first address input, an output address decoder for selecting a specific address in said read/write memory means from which stored data is to be provided to said data output in response to a second address input, an input counter for generating said first address which is applied to said input address decoder, an output counter for generating a second address which is applied to said output address decoder, means for resetting said input and output counters simultaneously, means for enabling the input counter so that it can be incremented in response to a clock signal applied to an input of said counter, means for enabling the output counter after a predetermined amount of data has been stored so that said output counter can be incremented in response to a clock signal applied to an input of said counter, and means for comparing the output of said input counter and the output of said output counter and for activating said resetting means when the outputs of said counters are the same.

* * * * *